United States Patent [19]

Pinckard et al.

[11] Patent Number: 5,005,345

[45] Date of Patent: Apr. 9, 1991

[54] METHOD FOR ACCELERATING THE BIODEGRADATION OF CROP RESIDUES FOLLOWING GRAIN HARVEST

[76] Inventors: Joseph A. Pinckard, 10840 Jilinda Court, San Jose, Calif. 95127; Paul E. Gill, 3131 Homestead Road, Santa Clara, Calif. 95051

[21] Appl. No.: 489,959

[22] Filed: Mar. 5, 1990

[51] Int. Cl.$^5$ .................... A01D 41/00; A01F 12/40; C05G 3/06
[52] U.S. Cl. ............................. 56/71; 56/1; 56/DIG. 2; 71/23; 460/11
[58] Field of Search .................. 56/1, 71, 168, 192, 56/194, 203, 206, 320.2, 500, DIG. 2, DIG. 5, DIG. 23; 460/22, 42, 44, 111, 112, 149, 150; 100/70 R, 70 A, 71; 71/23

[56] References Cited

U.S. PATENT DOCUMENTS

| | | | |
|---|---|---|---|
| 1,900,614 | 3/1933 | Poirot | 71/23 |
| 2,218,695 | 10/1940 | Leatherman | 71/23 X |
| 3,266,889 | 8/1966 | Duncan et al. | 423/28 X |
| 4,002,010 | 1/1977 | Passos . | |
| 4,056,107 | 11/1977 | Todd et al. | 460/112 |
| 4,164,405 | 8/1979 | Pinckard | 71/24 X |
| 4,332,125 | 6/1982 | Holdren | 56/1 |
| 4,539,799 | 9/1985 | Kalverkamp | 56/60 |
| 4,566,469 | 1/1986 | Semp et al. | 210/903 X |
| 4,637,406 | 1/1987 | Guinn et al. | 460/112 |
| 4,643,899 | 2/1987 | Kerr et al. | 426/61 X |
| 4,662,163 | 5/1987 | Adams | 56/16.8 X |
| 4,864,807 | 9/1989 | Ostrup et al. | 56/60 |
| 4,952,229 | 8/1990 | Muir | 71/23 X |

OTHER PUBLICATIONS

Buckman, H. O. and N. C. Brady, The Nature and Properties of Soils, 6th ed., 1963, The MacMillan Co., pp. 105–113, 405.

Alexander, M. Introduction to Soil Microbiology, 2 ed. John Wiley and Sons, NY, contents page, 1977.

Allison, F. E. Soil Organic Matter and Its Role in Crop Production, Elsevier Scientific Publishing Co., NY 1974, introductions, chap. 3,4,5.

*Primary Examiner*—George A. Suchfield
*Attorney, Agent, or Firm*—William S. Ramsey

[57] ABSTRACT

Improved agricultural technology has increased yields of cereal crops to a level wherein the crop residues left on the land are of such volume as to interfere with the following crop. Historically, these residues have been incinerated and the practice continues to this day, polluting the air, causing health problems, destroying valuable natural plant foods and soil humus. It is the nature of cereal crop residues to degrade slowly because of their low nitrogen content and complex polysaccharide chemical moieties. This application teaches that by crushing and shredding the crop residue and applying a liquid nutrient enrichment medium for the growth of the native soil microflora decay can be accelerated. Species of fungi such as Rhizopus, Aspergillus, Penicillium, and species of the hay bacillus, *Bacillus subtilis,* Actinomyces, and the like, all being indigenous soil inhabitants, feeding voraciously on our microbial nutrient enrichment medium, provided as herein described, induce an accelerated rate of decay removing the need for incinerating the crop residue. By means of this disclosure cereal growers may improve their land without harm to the environment. The implementation of this injective, already well known to the art of harvesting cereal crops and culturing an oxidative microflora, enables the owners of combine harvesters to assembly and use the disclosed method of accelerating decay of crop residues.

3 Claims, No Drawings

METHOD FOR ACCELERATING THE BIODEGRADATION OF CROP RESIDUES FOLLOWING GRAIN HARVEST

Technical advances in plant nutrition and agricultural engineering have increased the yield of cereal grains bringing about what some have called a "green revolution." Thousands of acres of rice, for example, are grown in the central valley of California. It is harvested by combine harvesters and the excess straw, after separating it from the grain, is left on the land. The volume of the unwanted straw, several tons per acre, interferes with land preparation for the next crop. Incineration of the straw by burning over the fields has been an accepted historical practice and, until recently, thought to be a harmless practice. This application for U.S. Patent provides a practical alternative to this environmentally harmful procedure.

BACKGROUND OF THE INVENTION

Straw, especially rice straw, has a thick epidermis containing cutin, suberin, wax and woody tissues (lignin) bearing a small amount of silicon as well as phenolic compounds. When incinerated the ash which contains the silicon and tar particles in the smoke may drift for miles on air currents carrying the smoke. The microscopic filaments of silicon and tar particles carried in the above manner are though to be responsible for an increase in the incidence of lung cancer known to occur above normal in rice and sugar cane growing districts, where the crop residues are incinerated. For this reason alone incineration of plant residues should be discontinued. There are other reasons, however, one being the loss of valuable organic matter and plant foods from our soils. A discussion of this latter subject may be found in any text on soil science. (Buckman, H. O. and N. C. Brady, The Nature and Properties of Soils, 1960, MacMillan, N.Y.).

This application for U.S. Patent teaches that if the straw be broken or U.S. Pat. No. 4,539,799 (Kalverkamp) describes an attachment for a combine harvester leaving the discarded crop residue in minced, shredded or in small pieces on the land which may then be easily prepared for a following crop.

The Kalverkamp patent relates to our application in that it provides for breaking and shredding the crop residue so that it may be easily worked back into the soil. It makes no provision for accelerating the decomposition of the residue which, in the case of a large yield of straw, remains undecayed on the land interfering with the following crop which only invites incineration resulting in air pollution and loss of plant foods and essential humus.

U.S. Pat. Nos. 4,864,807 (Ostrup, et al.) and 4,002,010 (DaSilva Passos) also relate to our application only insofar as they, among many others, chop the harvested crop into pieces before returning it to the land. No mention is made of treating the pieces of the crop being returned to the land with a microbial nutrient enrichment for the purpose of acceleration the degradation of the crop residue to avoid its incineration, pollution of the atmosphere, conserving plant foods and humus.

U.S. Pat. No. 4,662,163 (Adams) discloses a "Mobile Spray Applicator and Method of Spraying Forage" to assist in drying, preservation and rendering the forage more palatable for animal feed, an objective directly opposite to our application. However, if the Adams machine were fitted with a device for crushing and shredding straw and applying a microbial nutrient enrichment it could be used for our purpose but would not be as efficient as similar equipment attached to the rear of a combine grain harvester.

U.S. Pat. No. 4,643,899 (Kerr, et al.), "Microorganisms Having Characteristics of an Arthrobacter Capable of Degrading Peanut Hull Lignin" discloses a group of bacteria, indigenous in soils, that are capable of degrading lignitious materials. The major objective of the Kerr patent is to improve the use of peanut hulls for animal feed by treating the hulls with a culture of the bacterial genus Arthrobacter. Forty two strains of a similar species were isolated demonstrating the soil to be their common habitat. Of course the species Arthrobacter, including the Kerr isolate, is a neutral inhabitant of agricultural soils (page 14, lines 62-65) and may be expected to be only one of a large number of indigenous species taking part in the natural degradation of cereal straw as proposed in our application. Thus, the Kerr patent reinforces our claim that by adding specific microbial nutrients to crushed shredded cereal straw its biodegradation may be accelerated. If further proof be needed see a discussion of the bacterial genus Arthrobacter by Alexander, M., Soil Microbiology, 1977, John Wiley & Sons, N.Y., who shows this genus to play a major role in the degradation of plant materials.

U.S. Pat. No. 3,266,889 (Duncan), "Method of Extracting Metals from Sulfide Ores Using Bacteria and Accelerating Agent" in which a surfactant or wetting agent is used to accelerate the process. This patent clearly demonstrates the usefulness of certain wetting agents in combination with bacteria to bring about bacterial contact with a substrate. The close contact appears to improve chemical or enzymatic responses. Obviously selected wetting agents may prove useful in the microbial nutrient enrichment liquid described in our application.

U.S. Pat. No. 4,566,469 (Semp, et al.), "Process for Dissimilatory Denitrification of Tobacco" in which the major objective is to break down and remove nitrogen bearing compounds from smoking tobaccos. The process consists of adding one or more species of a denitrifying bacteria to tobacco in the presence of a microbial culture medium enabling the microflora to increase in numbers speeding the transformation of tobacco lead nitrogen compounds to nitrogen gas. Applying a vacuum to the system accelerates the removal of the nitrogen gas.

This patent may be remotely related to our application in that a microbial nutrient medium is added to the leaf tobaccos to accelerate transformation of protein nitrogen compounds to nitrogen gas. However, the process must be carried out under anaerobic conditions for the transformation to go to completion. Our process, being strictly aerobic, ends with the nitrogen being retained and available for the fertilization of the following crop, one of the main objectives of our application.

Finally we came upon an old U.S. Pat. No. 1,900,614, Poirot, (Mar. 7, 1933), in which is disclosed a method for adding chemicals to piles of straw while the grain is being threshed; the object being to accelerate biodegradation of the straw pile to manure through action of rain and microbial oxidation. As we have emphasized elsewhere, herein, crushing and shredding the straw is an important improvement over the old art, especially for the degradation of rice straw, one of the original objectives of our application. Another improvement over the Poirot patent, as disclosed in our application, is the treated straw is spread over the entire field such that it may be turned under without interfering with the following crop. Another improvement not mentioned by the Poirot patent is the use of wetting agents or surfactants with our liquid microbial nutrient. Still another improvement and a very important one is the presence of a humectant in our microbial liquid nutrient, molasses being such a substance. It draws moisture to itself from the surrounding air enabling opportunistic fungi to start growth in the absence of precipitation.

By combining the art of harvesting cereal grains with that of microbial degradation of plant debris as, for example, the microbial degradation of cotton gin waste, U.S. Pat. No. 4,164,405, we are able to degrade cereal crop residues on the surface of the land avoiding air pollution by incineration and conserving the contained plant foods and humic natural resources of cereal crop residues.

SUMMARY OF THE INVENTION

Agricultural crop residues and field wastes are commonly disposed of by incineration. This historical practice is now known to be dangerous to human health and be environmentally destructive of plant foods and soil humus. This disclosure teaches that agricultural crop wastes need not be incinerated but may be easily disposed of through natural processes of decay by the native microflora if suitable sources of nutrients and moisture be made available to start decay. As cereal crop plants mature the contained nitrogen is moved into the grain from the roots, leaves and stems. Very little is left in the straw and it becomes a limiting factor for the growth of the native microflora on and in the waste. Wheat straw, for example, contains only about 0.12% nitrogen while alfalfa hay contains 20 times more (Allison, F. E. Soil Organic Matter and It's Role in Crop Production, 1974, Elsevier Sci. Publ. Co., N.Y., p. 507). Under such conditions the straw decays very slowly even in contact with soil. Because of the slow decay of the straw it is usually incinerated to allow land preparation for the following crop. If a microbial nutrient enrichment solution or suspension be applied to the crop residue or straw, replacing the lost nitrogen harvested with the grain, the native microflora present on the straw and in soil is stimulated to increase in numbers which, in turn, accelerates biodegradation. Because the straw has an almost impermeable epidermis, mechanical breaking through the epidermis to allow moisture and nutrient penetration is essential for microbial decay from inside the hollow straw to the outside.

The process of the present invention provides for mechanical breaking or shredding of straw to allow penetration of a liquid microbial nutrient enrichment solution or suspension into the interior cavities. The nutrient solution must contain sources of nitrogen, iron and other essential minerals for growth of the native microflora. It must also contain a source of carbon to supply energy for the growth of the native microflora. Additionally the nutrient solution should contain a non-toxic wetting agent to allow more efficient wetting and penetration for the nutrient solution through the epidermal fractures. The decay causing microflora are able to draw moisture from the atmosphere until rainfall, dew or fog can provide additional moisture. The nutrient solution may be concentrated at the time of application because it will be diluted later by meteoric water. As degradation of the straw proceeds its physical strength decreases as it decomposes and returns to the soil as a form of enriching humus. The advantages of the process as taught by this disclosure are: Avoidance of air pollution by smoke, enrichment of the soil by the addition of valuable humus and decay of the crop waste in time for preparation of the next crop.

By adding special equipment to the combine harvester that crushes and shreds the crop residue then spraying a microbial nutrient enrichment medium on to the residue, it falls to the soil where the native soil microflora feed on the nutrient, increasing their numbers and accelerating decay. One objective of this invention is to provide grain growers with a practical alternative to burning crop residues, avoiding air pollution while conserving the natural resources of crop residues.

DETAILED DESCRIPTION OF THE INVENTION

At the rear of the combine and just before the straw or crop residue is expelled this invention requires the straw to be passed through a crusher or shredder to break through the waxy epidermis allowing a microbial nutrient solution to gain entry into the hollow almost sterile interior of the straw. The crushing-shredding device may be of any practical design but adapted to the space available on the combine harvester, be it at the rear or the front; examples are U.S. Pat. Nos. 4,539,799, 4,864,807 and 4,002,010, among others. Preferably the design of the crop residue crushing-shredding device should be left to the discretion of the manufacturers of combine harvesters. The same may be said for the device applying liquid microbial nutrient enrichment which should cover the crop residue just before it fall back to the land. These two pieces of equipment, while essential to fulfill the objectives of this application, should be designed and fitted to the combine-harvester by its manufacturer or ultimate owner. The objective of the crushing or shredding device is to provide access to the non-waxy interior of the hollow straw. The interior surface of the hollow stray is a rough cellulose surface which absorbs the aqueous microbial nutrient solution. The presence of both readily available nitrogen and carbon bearing sugar, in the presence of moisture, encourages the growth of straw degrading microorganisms present in the dust and on the surfaces of the straw. The design of the straw crushing-shredding device, as a part of the combine, is a relevant part of this invention and is essential for the microbial degradation of cereal straw as this disclosure teaches.

Just before the crushed straw is expelled from the combine it is sprayed with a coarse aqueous suspension of a microbial nutrient composed of carbon, nitrogen, phosphorus, potassium, sulfur, iron and other trace elements essential for microbial nutrition. The essential minor nutrients are all present as impurities in the fertilizer grade chemicals from which the microbial nutrient should be formulated, Table 1.

TABLE 1

Ingredients and amounts required to make 37.85 liters (10.0 gallons) of a microbial nutrient medium for the biodegradation of shredded crop residues.

| | Ingredients[a] Fertilizer grade purity | Quantity |
|---|---|---|
| 1. | Water | 37.85 Liters (10.0 gal.) |
| 2. | Molasses | 757.0 Grams |
| 3. | Wetting agent[b] | 757.0 Ml |
| 4. | Urea | 757.0 Grams |
| 5. | $(NH_4)_2 SO_4$ | 189.0 Grams |

TABLE 1-continued

Ingredients and amounts required to make 37.85 liters (10.0 gallons) of a microbial nutrient medium for the biodegradation of shredded crop residues.

| | Ingredients[a] Fertilizer grade purity | Quantity |
|---|---|---|
| 6. | $MgSO_4.7H_2O$ | 189.0 Grams |
| 7. | EDTA iron (13.0%) | 189.0 Grams |
| 8. | $K_2HPO_4$ | 76.0 Grams |
| 9. | $KH_2PO_4$ | 302.0 Grams |
| 10. | $Ca(NO_3)_2$ | 189.0 Grams |

[a]Ingredients to be added to water as listed and applied at a rate of 2 gallons per acre harvested.
[b]Non-ionic non-toxic surfactant. A common example being Triton X-100 manufactured by Rohm & Haas Co., Philadelphia, PA.

The above named ingredients are an example of a basic nutrient medium required for the biodegradation of straw and other crop residues. Although some carbon is present in the straw as starch and polysaccharides a small amount of sugar such as dextrose, common molasses, malt extract and invert sugars will accelerate biodegradation as immediately available sources of energy and as humectants. Other essential elements in the formulation are compounds of phosphorus, potassium, sulfur and iron. The latter is best offered as a chelate although any of the iron salts will suffice. All essential elements should be of fertilizer grade purity.

Although Table 1 shows the amount of ingredients for 10 gallons of water the water may be increased or decreased to an amount consistent with the practical operation of the process and the combine. Assuming the combine harvests five acres per hour and two gallons of liquid nutrient per acre are used, 100 gallons of the nutrient will be required per day, more or less. The liquid nutrient suspension should be applied as a spray to the crushed or shredded straw just before it is expelled by the combine. While the nutrient solution may dry and remain dry during the remainder of the harvest season dew, fog and rain will eventually occur and the hygroscopic nutrient medium will absorb enough moisture from the air and soil to affect germination and growth of fungi, especially species of Rhizopus which has the capability of using atmospheric moisture to promote its own growth. As moisture is absorbed into the broken stems the native bacteria are able to use the nutrient medium for increasing their numbers and decay of the straw is accelerated.

Another effective or alternative procedure for the degradation of crop residues is to spray the nutrient medium on the field after harvest using a dosage of two or more gallons per acre by air or ground equipment.

The formulation illustrated in Table 1 may also be made by mixing the dry powders together, except for the wetting agent which, if a liquid, must be added to the tank mix with the water.

This method may be used on straw and other residues of rice, wheat, oats, barley, rye, milo, corn or the like.

What is claimed:

1. A method for accelerating biodegradation of nutrient-deficient straw residues of cereal grain grown in a field comprising the steps: separating straw from the grain, crushing the straw, applying a nutrient solution containing a humectant selected from the group consisting of molasses, dextrose, malt extract, and invert sugar to the straw, and distributing the straw on the field.

2. The method of claim 1 wherein the humectant is molasses.

3. The method of claim 2 wherein the humectant at a concentration of about 20 grams per liter of nutrient solution.

* * * * *